United States Patent
Fox et al.

(10) Patent No.: US 11,269,351 B2
(45) Date of Patent: Mar. 8, 2022

(54) MODIFYING NAVIGATION COMMANDS

(71) Applicant: INTERNATIONAL BUSINESS MACHINES CORPORATION, Armonk, NY (US)

(72) Inventors: Jeremy R. Fox, Georgetown, TX (US); Kelley Anders, East New Market, MD (US); Lisa Seacat DeLuca, Baltimore, MD (US); Zachary A. Silverstein, Jacksonville, FL (US)

(73) Assignee: International Business Machines Corporation, Armonk, NY (US)

( * ) Notice: Subject to any disclaimer, the term of this patent is extended or adjusted under 35 U.S.C. 154(b) by 216 days.

(21) Appl. No.: 16/703,976

(22) Filed: Dec. 5, 2019

(65) Prior Publication Data
US 2021/0173409 A1 Jun. 10, 2021

(51) Int. Cl.
*G05D 1/02* (2020.01)
*G01C 21/36* (2006.01)

(52) U.S. Cl.
CPC ....... *G05D 1/0274* (2013.01); *G01C 21/3626* (2013.01); *G05D 1/0251* (2013.01); *G05D 2201/0213* (2013.01)

(58) Field of Classification Search
CPC .............. G05D 1/0274; G05D 1/0251; G05D 2201/0213; G05D 1/0088; G01C 21/3626; G01C 21/3641
See application file for complete search history.

(56) References Cited

U.S. PATENT DOCUMENTS 9,008,858 B1 * 4/2015 Payne .................... B60G 17/02
701/1
9,321,441 B1 4/2016 Shah
(Continued)

FOREIGN PATENT DOCUMENTS

WO 2013041517 A1 3/2013

OTHER PUBLICATIONS

JBL, "Why Buy Direct From JBL.com?", 2019, 3 pages.
(Continued)

*Primary Examiner* — Rami Khatib
(74) *Attorney, Agent, or Firm* — Teddi E. Maranzano

(57) ABSTRACT

A method, computer system, and computer program product for using sensor data to modify navigation commands. The method may include predicting a user's navigational action and modifying a navigation command based on comparing the user's predicted navigational action to a recommended navigational action. The modifying the navigation command may include communicating a navigation command to a user based on the user's predicted navigational action deviating from a predetermined navigational action. The modifying the navigation command may include suppressing a queued navigation command to a user based on the user's predicted navigational action conforming to a predetermined navigational action. Predicting the user's navigational action may be based on information received from one or more sensors embedded in a vehicle. The modifying the navigation command may include increasing a frequency of communicating a queued navigation command to a user or decreasing a frequency of communicating a queued navigation command to the user.

14 Claims, 5 Drawing Sheets

(56) References Cited

U.S. PATENT DOCUMENTS

| | | | |
|---|---|---|---|
| 9,988,037 B2* | 6/2018 | Prakah-Asante | B60W 10/06 |
| 10,011,216 B1* | 7/2018 | Rovik | G06K 9/00798 |
| 11,104,323 B2* | 8/2021 | Geller | B60W 20/11 |
| 2005/0274553 A1* | 12/2005 | Salman | B60L 58/12 |
| | | | 180/65.28 |
| 2009/0157294 A1 | 6/2009 | Geelen | |
| 2010/0292886 A1 | 11/2010 | Szczerba | |
| 2010/0324816 A1* | 12/2010 | Highstrom | G01C 21/367 |
| | | | 701/533 |
| 2012/0158283 A1* | 6/2012 | Arastafar | G01C 21/3641 |
| | | | 701/410 |
| 2014/0039789 A1 | 2/2014 | Bell | |
| 2015/0142205 A1* | 5/2015 | Harsham | B60W 50/0097 |
| | | | 701/1 |
| 2015/0276421 A1 | 10/2015 | Beaurepaire | |
| 2017/0284815 A1 | 10/2017 | Strode | |
| 2017/0284822 A1 | 10/2017 | Foster | |
| 2018/0283891 A1* | 10/2018 | Andrew | G01C 21/3629 |
| 2018/0326968 A1* | 11/2018 | Geller | B60W 50/0097 |

OTHER PUBLICATIONS

Mell et al., "The NIST Definition of Cloud Computing", Recommendations of the National Institute of Standards and Technology, Special Publication 800-145, Sep. 2011, 7 pages.

Navdy, "Heads Up Display Provides enhanced vehicle and smartphone connectivity in driver's line of sight", 2019, 6 pages.

Owano, "Navdy projects transparent image in driver's field of view", Aug. 6, 2014, TechXplore, pp. 1-3.

* cited by examiner

MODIFYING NAVIGATION COMMANDS

BACKGROUND

Embodiments of the present invention relate generally to a method, system and computer program for using sensor data to modify navigation commands.

Oftentimes, when traveling to a destination, a user may use a navigation system in order to get navigation directions to reach that destination. The navigation system may provide visual and auditory cues respecting which roads to take and where to turn.

BRIEF SUMMARY

An embodiment of the present invention may include a method, computer system, and computer program product for using sensor data to modify navigation commands. The method may include predicting a user's navigational action and modifying a navigation command based on comparing the user's predicted navigational action to a recommended navigational action. The modifying the navigation command may include communicating a navigation command to a user based on the user's predicted navigational action deviating from a predetermined navigational action. The modifying the navigation command may include suppressing a queued navigation command to a user based on the user's predicted navigational action conforming to a predetermined navigational action. Predicting the user's navigational action may be based on information received from one or more sensors embedded in a vehicle. The information received form the one or more sensors may include a braking event, an acceleration event, a speed limit indication, a turn signal activation, a windshield wiper engagement, a radio sound detection, an ambient sound detection, an image processing result, a fault code trigger, an in-vehicle camera image detection, or an external vehicle image detection. The modifying the navigation command may include at least one of increasing a frequency of communicating a queued navigation command to a user and decreasing a frequency of communicating a queued navigation command to the user. The method may include comparing the user's predicted navigational action to historical data of a user.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

DETAILED DESCRIPTION

Figure 1:
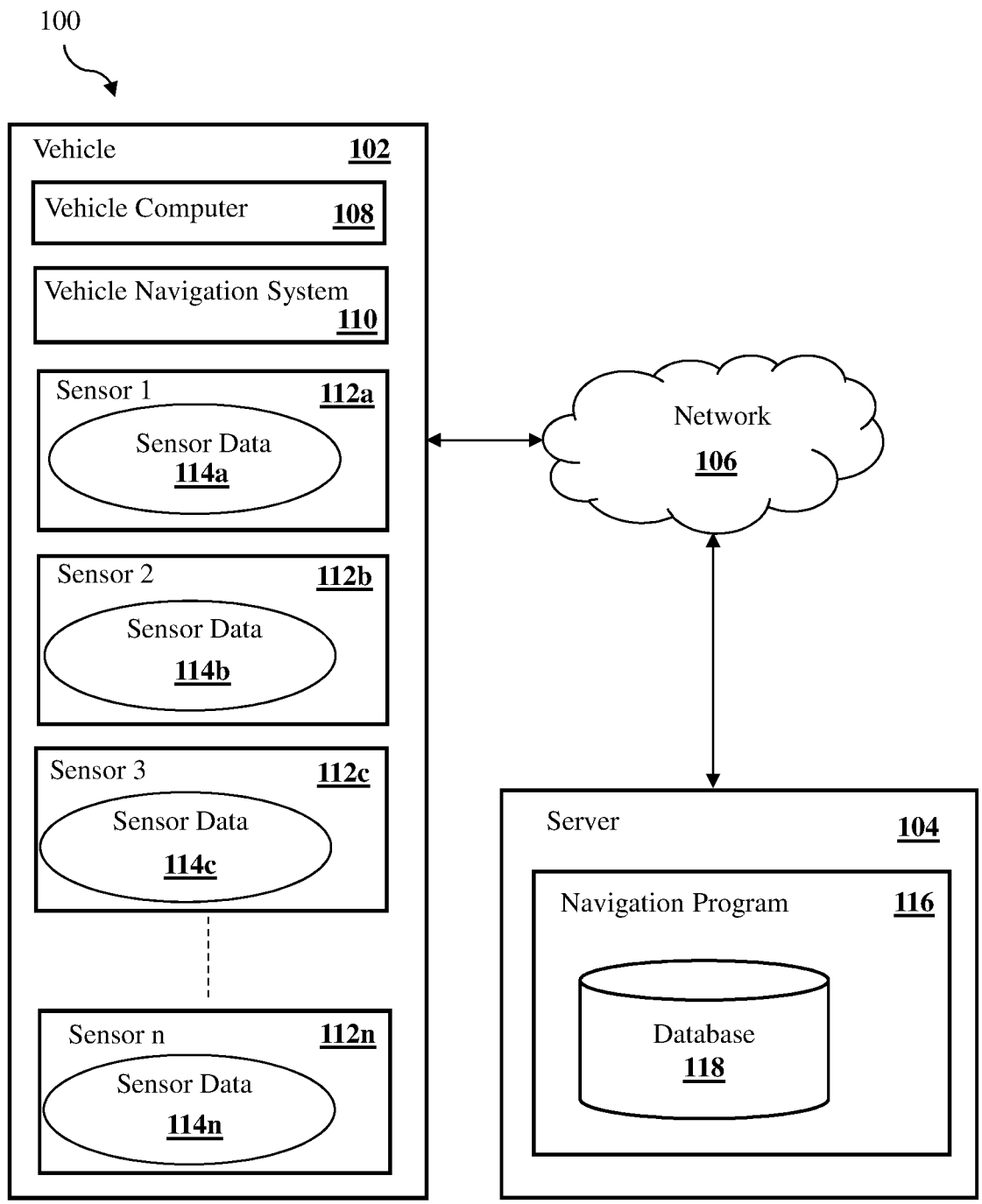
FIG. 1 is a schematic block diagram illustrating a system for using sensor data to modify navigation commands, in accordance with an embodiment of the invention.

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention provide a method, computer program, and computer system for using sensor data within a vehicle to modify navigation commands. Users often utilize a vehicle's navigation system to provide them with navigation commands that enable them to reach their desired destinations. For example, a user may wish to drive to a restaurant that is located in another town. Another user may wish to utilize the navigation system when driving home from work because the user just started the job and is unfamiliar with the location. Each user, in the above examples, may use the user's vehicle navigation system to get directions to their respective destinations. However, each user may need different levels of navigation system support, depending on factors, such as, for example, each user's ability to follow the navigation system command, each user's distraction level or each user's familiarity with the route. Current navigation systems may not provide a way of modifying the navigation commands commensurate with each user's need for such navigation commands. As such, there exists a need to modify navigation commands based on data received by the sensor within the vehicle.

Accordingly, at least some of the embodiments described herein provide a technical solution to the problems described above with respect to modifying navigation commands based on sensor data. Specifically, some embodiments described herein provide a navigation program that may be used to ensure that the user reaches the desired destination by modifying navigation commands based on data received from sensors located in the user's vehicle.

Reference will now be made in detail to the embodiments of the present invention, examples of which are illustrated in the accompanying drawings, wherein like reference numerals refer to like elements throughout. Embodiments of the invention are generally directed to using an electronic alarm management program to notify a user of an upcoming event.

FIG. 1 illustrates a system 100 for using sensor data to modify navigation commands, in accordance with an embodiment of the present invention. In an example embodiment, the system 100 may include a vehicle 102 and a server 104, all connected via one or more networks 106.

In an embodiment, the network 106 may be the Internet, representing a world-wide collection of networks and gateways to support communications between devices connected to the Internet. The network 106 may include, for example, wired, wireless, or fiber optic connections. In alternative embodiments, the network 106 may be implemented as an intranet, a local area network (LAN), or a wide area network (WAN). In general, the network 106 may be any combination of connections and protocols that will support communications between the vehicle 102 and the server 104. The network 106 may be an example of a communications network 1200 illustrated in FIG. 3.

In an embodiment, the vehicle 102 may include a vehicle computer 108, a vehicle navigation system 110, and a plurality of sensors 112a, 112b, 112c, 112n. The vehicle 102 may be an automobile, a truck, a bus, a bicycle, or any other type of mode of transportation. The vehicle computer 108 may be an instance of the computer 1010 shown in FIG. 3. The vehicle computer 108 may be used to communicate with the plurality of sensors 112a, 112b, 112c, 112n, a navigation program 116, and the vehicle navigation system 110. The vehicle navigation system 110 may include a user interface and may be used to provide visual and auditory navigation commands to a user.

The plurality of sensors may include a first sensor 112a, a second sensor 112b, a third sensor 112c, and Nth sensor 112n. Although FIG. 1 shows four sensors, sensor 1, sensor 2, sensor 3 and sensor N, principles of an embodiment of the present invention are not restricted to four sensors and may be used with any number of sensors.

Sensors 112a, 112b, 112c, 112n each comprise sensor data 114a, 114b, 114c, 114n, respectively. Sensors 112 may be embedded in the vehicle 102, in the interior. Sensors 112 may also be embedded on the outside body of the vehicle 102. Sensors 112 may comprise different functional components, however each sensor may provide input data that may be used by the method described herein. Each sensor 112 may store information respecting its sensor activity in the designated sensor data 114.

Sensors 112 may be, but are not limited to, braking sensors, proximity sensors, accelerometers, volume sensors, turning signal sensors, windshield wiper sensors, trailer light hookup sensors, visor sensors, microphone sensors, infrared sensors, pressure sensors, light sensors, location sensors, image recognition sensors, or any other sensors that may be used with the embodiments of the invention. The sensors 112 may be "Internet of Things" (IoT) sensors. The "Internet of Things" refers to the network of physical objects or "things" that are embedded with and/or otherwise include electronics, software, sensors, and network connectivity that allow these objects to collect and exchange data.

Sensor data 114 may be information received from the sensors 112. Sensor data 114 may be information that includes, but is not limited to, a braking event, an acceleration event, a speed limit indication, a turn signal activation, a windshield wiper engagement, a radio sound detection, an ambient sound detection, an image processing result, a fault code trigger, an in-vehicle camera image detection, or an external vehicle image detection.

The server 104 may include a navigation program 116. In the example embodiment, the server 104 may be a desktop computer, a notebook, a laptop computer, a tablet computer, a thin client, or any other electronic device or computing system capable of storing, compiling, and organizing audio, visual, or textual content, and receiving and sending that content to and from other computing devices. The server 104 may also be a remote server. For example, the server 104 may bet at a Cloud location remote from the vehicle 102, such as a navigation program server.

The navigation program 116 may include a database 118. The navigation program 116 may receive the sensor data 114 captured by the sensors 112 via the network 106. Once received, the navigation program 116 may analyze the sensor data 114 to determine whether navigation commands, provided by the vehicle navigation system 110, need modification. For example, the navigation program 116 may receive sensor data 114 from the windshield wiper sensor. The sensor data 114 may indicate that the windshield wipers are engaged in the vehicle 102. The navigation program 116 may determine that because the windshield wipers are engaged, the weather conditions may be poor and visibility may be limited. As such, the navigation program 116 may modify the navigation commands provided by the vehicle navigation system 110 by increasing the volume of the queued recommended navigation commands so that the user may hear the navigation commands over the noise created by the windshield wipers. In an embodiment, the navigation program 116 may increase the frequency of communicating a queued recommended navigation command to the user. In another example, a microphone sensor captures the user state "oh, there it is". The navigation program 116 may analyze the sensor data 114 from the microphone sensor and determine that the user knows where the user is going. The navigation program 116 may then mute the subsequent recommended navigation commands.

Although FIG. 1 illustrates the navigation program 116 included in a server 104 remote from the vehicle 102, it should be appreciated that the navigation program 116 may be included in the vehicle 102 in the form of an application. The navigation program 116 may be an example of programs 1060 illustrated in FIG. 3.

The database 118 may store user's personal information, threshold reaction times for the user, historical driving data, or any other information that may be used by the navigation program 116 to determine whether navigation commands may be modified. In an embodiment of the present invention, the user's personal information may include the user's name and image. For example, the user's name may be Jane, and Jane's picture may be stored along with her name on the database 118. When Jane gets into the vehicle 102, a sensor 112, for example an image sensor, coupled with a computing device configured for image recognition, may capture Jane's image and determine that Jane is in fact Jane. The computing device may include software for determining features and visual elements from digital image data provided by the image sensor 112. For example, the computing device may employ known algorithms such as deep learning convolutional neural network (CNN) techniques, edge detection algorithms, active contour algorithms, blob detection methods, scale-invariant feature transform (SIFT) algorithms, or Eigenface methods. Techniques for recognizing and classifying features and visual elements are well known in the art, and any suitable technique or combination of techniques may be employed in the computing device configured for image recognition.

In addition to Jane's personal information, the database 118 may store Jane's threshold reaction times. Threshold reaction times may refer to the time it takes for a user to prepare to execute a certain recommended navigation command. The user's threshold reaction time may be based on the speed limit of the portion of the route on which the user is traveling. The user's threshold reaction time may also be based on the distance the user is away from navigation step. For example, the user is traveling in the middle lane of a three-lane road. The user receives a navigation command stating that the user should turn left in 500 feet. Since the user is in the middle lane, the user needs to move to the left lane in order to execute the left turn. The threshold reaction time is the time it takes the user to move from the middle lane to the left lane. In an embodiment of the present invention, the threshold reaction time may be a numerical value, ranging from 0 to 60. The time may be measured in seconds.

In an embodiment of the present invention, the threshold reaction time may be initially set by the user and modified by the user. For example, the user may initially set the user's threshold reaction time to 10 seconds. This means that the user may prepare to execute a given navigation command within 10 seconds of receiving it. During the course of the user's driving, the user may determine that it takes the user about 10 seconds to prepare to execute the navigation command. As such, the user decides to keep the 10 seconds as the threshold reaction time. However, if during the course of the user's driving, the user may determine that it takes the user about 15 seconds to prepare to execute the navigation command, the user may modify the threshold reaction time from 10 seconds to 15 seconds.

In another embodiment, the threshold reaction time may be initially preset by the navigation program 116 and later modified by the navigation program 116, based on historical data of the user, or by the user himself/herself. For example, the navigation program 116 sets the threshold reaction time for the user to be 20 seconds. During the course of the user's driving, the navigation program 116 determines that it takes the user 15 seconds to prepare to execute the navigation commands. The navigation program 116 may modify the threshold reaction time from 20 seconds to 15 seconds. Optionally, the user himself/herself may modify the threshold reaction time and change it from 20 seconds to any other time the user wishes to use.

In an embodiment of the present invention the historical driving data may refer to the user's driving history. For example, the navigation program 116 may determine, by analyzing the user's navigational history, that the user has traveled a particular stretch of the road many times without ever missing to execute a recommended navigation command or without ever missing a particular turn. For example, the navigation program 116, based on the driving directions provided by the vehicle navigation system 110, determines that the user is on his/her way home from work. The navigation program 116 analyses the user's driving history with respect to that travel route and determines that the user has always prepared to execute the navigation commands within the threshold reaction time. The navigation program 116 determines that the user knows how to navigate the travel route that is currently programmed into the vehicle navigation system 110. As such, the navigation program 116 may modify the navigation command by suppressing the queued navigation commands such that the user no longer hears the subsequent navigation commands.

In another embodiment, the historical driving data may refer to the user's driving history for a particular vehicle 102. For example, the user's everyday vehicle 102 is a small sedan. As such, the navigation program 116 may store, in its database 118, the user's historical driving data and associate that historical driving data with the sedan when the data was created while utilizing the sedan. Sometimes, the user may utilize another vehicle 102, such as, for example, a truck with a trailer. The navigation program 116 may capture the user's driving data when driving the truck with the trailer and store the user's historical driving data and associate that historical driving data to the truck with the trailer. Therefore, the next time the user is driving a vehicle 102, the navigation program 116 may identify the user using the image sensor 112 and the type of vehicle 102, by connecting with the vehicle computer 108. The navigation program 116 may then identify the appropriate historical driving data for that user and that particular vehicle 102.

Figure 2:
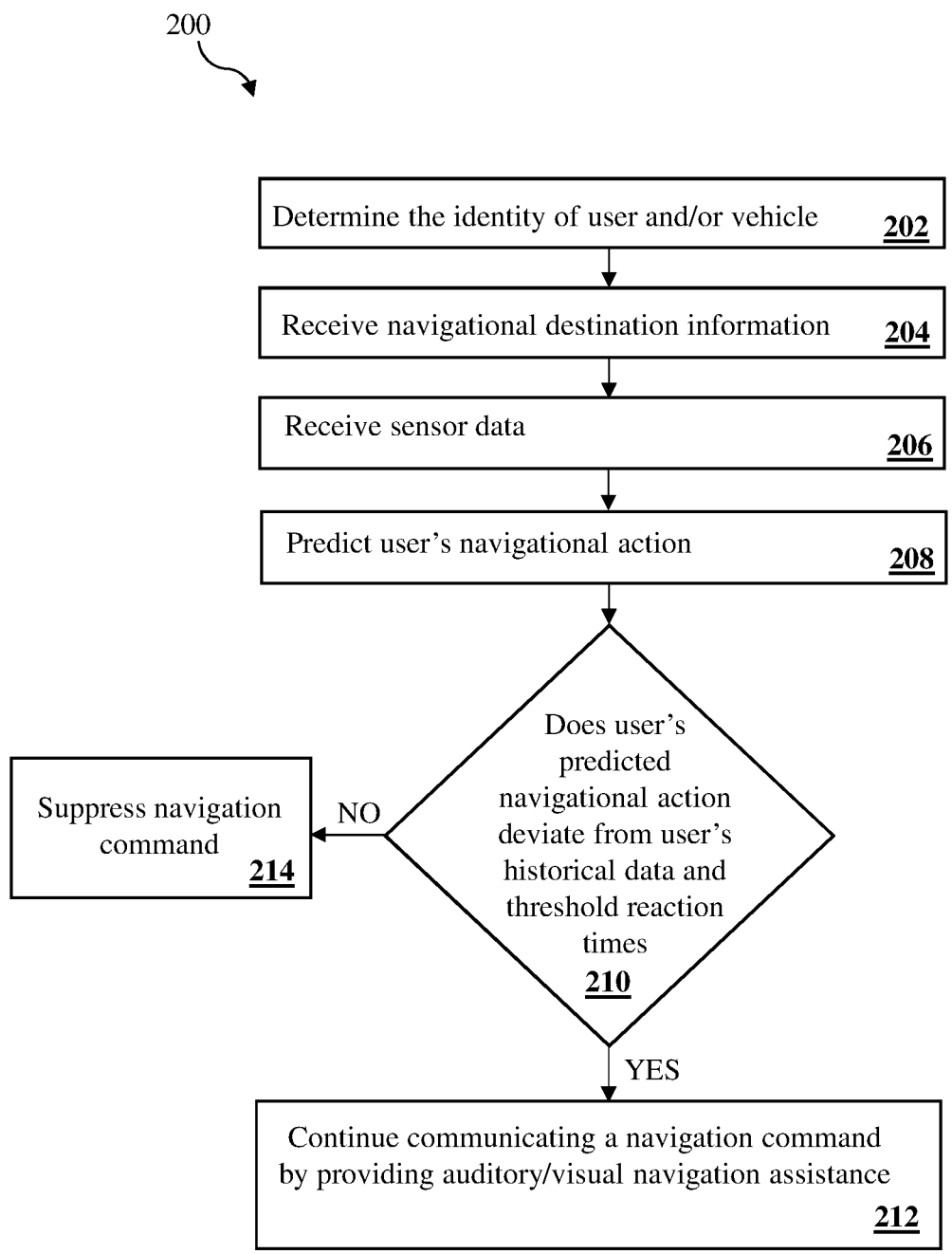
FIG. 2 is a flow chart illustrating an example method for using sensor data to modify navigation commands, in accordance with an embodiment of the invention.

Referring to FIG. 2, a method 200 for using sensor data to modify navigation commands is depicted, in accordance with an embodiment of the present invention.

Referring to operation 202, the navigation program 116 may determine the identity of the user and/or the vehicle 102. The navigation program 116 may utilize sensors 112 within the vehicle 102 to determine the identity of the user. For example, once the user sits in the driver seat of the vehicle 102, the navigation program 116 may collect data from the image sensor 112 and compare the image captured by the image sensor 112 with the image stored in its database 118 do determine the identity of the user.

The navigation program 116 may also determine what type of vehicle 102 the user is using by connecting to the vehicle computer 108 using a network or a Bluetooth® connection. For example, the navigation program 116 may determine that the user is using the vehicle 102 that the user is usually always using. That vehicle 102 is a small sedan. In another example, the user may be using another vehicle 102, such as, for example, a truck with a trailer attached to it.

Referring to operation 204, the navigation program may receive navigational destination information from the vehicle navigation system 110. When the user enters a destination address in the vehicle navigation system 110, the vehicle navigation system 110 may calculate a route for the user to take to reach that destination. In another embodiment, the user may enter the destination address in a navigation application of a mobile device. The user's mobile device may connect with the vehicle navigation system 110, via a Bluetooth® connection, and transmit the destination address to the vehicle navigation system 110.

The route may be displayed on the user interface that is part of the vehicle navigation system 110 and the step by step directions may be relayed to the user by using visual and auditory system of the vehicle 102. Once the user chooses a particular route to take to the destination, the vehicle navigation system 110 may provide visual and auditory navigation commands to the user. The navigation program 116 may receive the navigation destination information from the vehicle navigation system 110 and may compare the navigation destination information with the historical destinations that the user has traveled to in order to determine whether the user is traveling to a destination that the user has never been to or whether the user is traveling to a destination that the user has previously frequented. For example, if the user is traveling to a destination that the user has never been to before, the user may be unfamiliar with the area and the roads leading to the destination. As such, the navigation program 116 may modify the navigation commands by increasing the frequency of communicating a queued recommended navigation command to the user so that they user gets to the destination without missing any recommended navigation commands.

Referring to operation 206, the navigation program 116 may receive sensor data 114 captured by the sensors 112 that are inside the vehicle 102 or on the outside body of the vehicle 102. The sensors 112 may continuously provide sensor data 114 to the navigation program 116 while the vehicle navigation system 110 is providing recommended navigation commands. For example, a windshield wiper sensor (112) may send the navigation program 116 sensor data 114 indicating that the windshield wipers are on. An acoustic sensor (112) may capture and send the navigation program 116 sensor data 114 of kids screaming in the back of the vehicle 102. A turn sensor (112) may send the navigation program 116 sensor data 114 which indicates that the left turn signal is turned on.

Referring to operation 208, the navigation program 116 may analyze the sensor data 114 received from the sensors 112 to predict the user's navigational action. The user's navigational action may refer to the user's travel patterns, such as, for example, stopping, turning, accelerating, decelerating, reversing or other travel patterns that may be used to predict the user's navigational action. For example, the user receives a navigation command indicating that in one mile the user should turn left. When the user receives the navigation command, the user is in the right line of a three-lane road. In order to execute the navigation command, the user switches lanes and positions himself/herself in the left lane in order to execute the recommended navigation command. When the user is switching lanes, the user engages the vehicle's 102 left blinker. Further, when approaching the intersection where the user should turn left, the user is decelerating. The navigation program 116 may receive sensor data 114 from the vehicle's 102 sensors 112, such as, for example, the turning signal sensor 112 and the breaking sensor 112 to predict the user's navigational action. In this example, the navigation program 116 may predict that at the intersection the user will turn left, thus executing the recommended navigation command.

The navigation program 116 may also predict the user's navigational action by calculating the user's threshold reaction times for each navigation command that is provided to the user by the vehicle navigation system 110. Continuing with the example from above, the navigation program 116 may calculate the time it takes the user to switch lanes in order to position himself/herself in the best lane to execute the recommended navigation command.

Referring to operation 210, the navigation program 116 may compare the user's predicted navigational action with the user's historical data and threshold reaction times to determine whether the user's predicted navigational action deviates from the user's historical data and threshold reaction times. For example, continuing with the example from above, the user has traveled that stretch of the route over one hundred times and never missed that left turn. Further, the navigation program 116 predicted, at operation 208, that the user will turn left, executing the recommended navigation command. In addition, the navigation program 116 determined that the user's threshold reaction time conforms to the threshold reaction time stored in the database 118.

In an embodiment, the navigation program 116 may analyze whether, during the course of the vehicle navigation system 110 being engaged, the user has followed the recommended navigation commands. For example, the navigation program 116 may analyze the sensor data 114 received from sensors 112 and may determine that the user has executed every navigation command that has been provided by the vehicle navigation system 110.

In another embodiment, the navigation program 116 may analyze sensor data 114 to determine whether the user is distracted while operating the vehicle 102. For example, the microphone sensor (112) may send the navigation program 116 sensor data 114 in which the user is engaged in a loud conversation with other occupants of the vehicle 102. The navigation program 116 may determine that the user may be distracted. In another example, the volume sensor (112) may send the navigation program 116 sensor data 114 indicating that the volume is turned up to its maximum level. Further, the image sensor 112 may send the navigation program 116 sensor data 114 indicating that the user is singing. The navigation program 116 may analyze the sensor data 114 received from each of the sensors 112 and determine that because the volume is turned to its maximum level and the user is singing, the user may be distracted.

In an embodiment, the navigation program 116 may also compare the user's predicted threshold reaction times with the user's historical reaction times stored in the database 118 to determine whether the user's threshold reaction times deviate from the historical threshold reaction times. For example, if the user's predicted threshold reaction times conform with the user's historical threshold reaction times, the navigation program 116 may determine that the user's predicted navigational action does not deviate from the user's historical threshold reaction times. For example, the navigation program 116 may determine that it takes the user 15 seconds to position himself/herself in order to then execute the recommended navigation command. The navigation program 116 may analyze the user's historical threshold reaction time and determine that the user's threshold reaction time should be about 15 seconds. Since the user's threshold reaction time conforms with the historical threshold reaction time, the navigation program 116 may determine that the user's predicted navigational action does not deviate from the user's historical data.

In yet another embodiment, the navigation program 116 may also compare the user's current travel patterns with the travel patterns stored in the database 118 to determine whether the user's current travel patterns deviates from historical data. For example, the user has traveled the route many times before. The user's historical driving pattern indicates that the user has always stayed within the speed limit and has always maintained adequate distance from the vehicle 102 before him/her. However, during the course of this particular trip, the user is well above the speed limit. In addition, the user is frequently changing lanes and is tailgating. The navigation program 116 may determine that the user's current travel pattern deviates from the user's historical travel pattern for the same stretch of the route.

When the user's predicted navigational action deviates from the user's historical data and threshold reaction times, the navigation program 116, at operation 212, may continue communicating a navigation command to the user by allowing the vehicle navigation system 110 to continue providing auditory and/or visual navigation assistance.

When the user's predicted navigational action does not deviate from the user's historical data and threshold reaction times, the navigation program 116, may proceed to operation 214.

Referring to operation 214, the navigation program 116 suppresses the navigation command if the user's predicted navigational action does not deviate from the user's historical data and threshold reactions times. The navigation program 116 may suppress the navigation command by muting the vehicle navigation system 110 such that the subsequent recommended navigational action is not relayed to the user.

In an embodiment, the navigation program 116 may automatically suppress the subsequent navigation command. In an alternative embodiment, the navigation program 116 may ask the user whether the user wishes for subsequent navigation commands to be suppressed. For example, the navigation program 116 may utilize the vehicle's 102 auditory sensor to ask the user whether the user wishes to suppress the vehicle navigation system 110. The user may allow the navigation program 116 to suppress the navigation command by replying "yes.' Alternatively, the user may prevent the navigation program 116 from suppressing the subsequent navigation command by replying "no."

When the navigation program 116 suppresses the subsequent navigation command, the navigation program 116 may continue to receive sensor data 114 from the sensors 112 and analyze the sensor data 114 to determine whether the user's predicted navigational action deviate from the navigational action that is predetermined by the vehicle navigation system 110. If the user's predicted navigational action deviates from the navigational action that is predetermined by the vehicle navigation system 110, the navigation program 116 may modify the navigation command by communicating the navigation command through the use of the vehicle navigation system 110. For example, the navigation program 116 determines, at operation 210, that the user's predicted navigational action does not deviate from the user's historical data and suppresses, at operation 214, the navigation command. However, when the navigation commands are suppressed, the user gets distracted and misses a recommended turn. The navigation program 116 may instruct the vehicle navigation system 110 to reinstate audio and visual navigation assistance.

In an embodiment, based on the type of vehicle 102 the user is utilizing, the navigation program 116 may continue communicating the navigation commands even though the user's predicted navigational action does not deviate from the user's historical data and threshold reaction times. For example, the navigation program 116 determines that the vehicle 102 the user is utilizing is a truck. In addition, the navigation program 116 receives sensor data 114 from the trailer light hookup sensor (112) indicating that the trailer light hookup sensor (112) is engaged. The navigation program 116 determines that the user is driving a vehicle 102 that the user does not normally drive on a daily basis. Further, based on the user's historical data and threshold reaction times, the navigation program 116 determines that the user usually drives slower than normal when utilizing the truck with the trailer. However, the user's threshold reaction times conform to the user's historical reaction times for that particular vehicle 102. The navigation program 116 determines that the user is executing every navigation command provided to the user by the vehicle navigation system 110.

Normally, the navigation program 116 may modify the navigation command by suppressing the subsequent navigation commands or decreasing the frequency with which the navigation commands are provided to the user. However, because the user is utilizing a vehicle 102 that is a truck with a trailer, the navigation program 116 does not suppress navigation commands. In an embodiment, the navigation program 116 may continue to communicate the navigation commands. Since it may be tougher to navigate a truck with a trailer, in an alternative embodiment, the navigation program 116 may modify the navigation commands by increasing the frequency with which the navigation commands are provided to the user to ensure the user does not miss any turns.

In an embodiment the navigation program 116 may modify the navigation commands, such as, for example, by redirecting the user to a different destination. For example, the navigation program 116 may receive sensor data 114 from a tire pressure sensor (112) indicating that the pressure in one of the vehicle's 102 tires is low. In another example, the navigation program 116 may receive sensor data 114 from a gas gauge sensor (112) indicating that the vehicle 102 is low on gas. In both examples, the navigation program 116 may modify the navigation commands by changing the destination address to another destination, such as, for example, a gas station or a vehicle repair shop. The navigation program 116 may continuously predict user's navigational actions and compare them to the user's historical data and threshold reaction times to determine whether the new recommended navigation commands should be modified.

The user's historical data may indicate that the user is familiar with the area where the new destination address is because the user has pumped gas that that particular gas station. In such a case, the navigation program 116 may modify the navigation commands by decreasing the frequency with which the navigation commands are provided to the user. Alternatively, the navigation program 116 may increase the frequency with which the navigation commands are provided to the user if the navigation program 116 determines, based on the user's historical data, threshold reaction times, or user's navigational actions, that the user is unfamiliar with the area.

Figure 3:
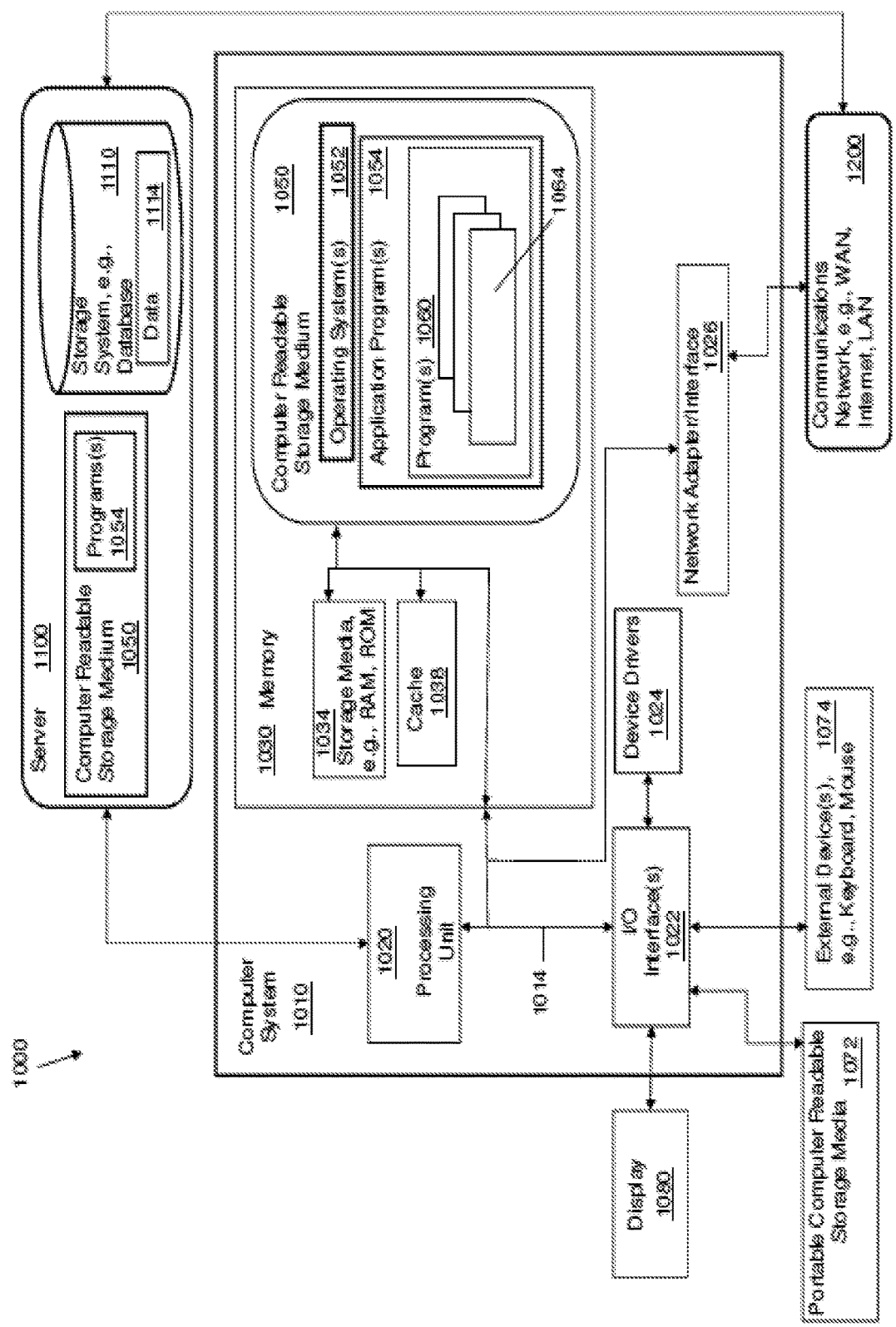
FIG. 3 is a block diagram depicting the hardware components of a system for using an electronic alarm management program to notify a user of an upcoming event, in accordance with an embodiment of the invention.

Referring to FIG. 3, a system 1000 includes a computer system or computer 1010 shown in the form of a generic computing device. The method 200, for example, may be embodied in a program(s) 1060 (FIG. 3) embodied on a computer readable storage device, for example, generally referred to as memory 1030 and more specifically, computer readable storage medium 1050 as shown in FIG. 3. For example, memory 1030 can include storage media 1034 such as RAM (Random Access Memory) or ROM (Read Only Memory), and cache memory 1038. The program 1060 is executable by the processing unit or processor 1020 of the computer system 1010 (to execute program steps, code, or program code). Additional data storage may also be embodied as a database 1110 which can include data 1114. The computer system 1010 and the program 1060 shown in FIG. 3 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 3 as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 3, the system 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media 1034 in the form of volatile memory, such as random access memory (RAM), and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method 200 (FIG. 2), for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
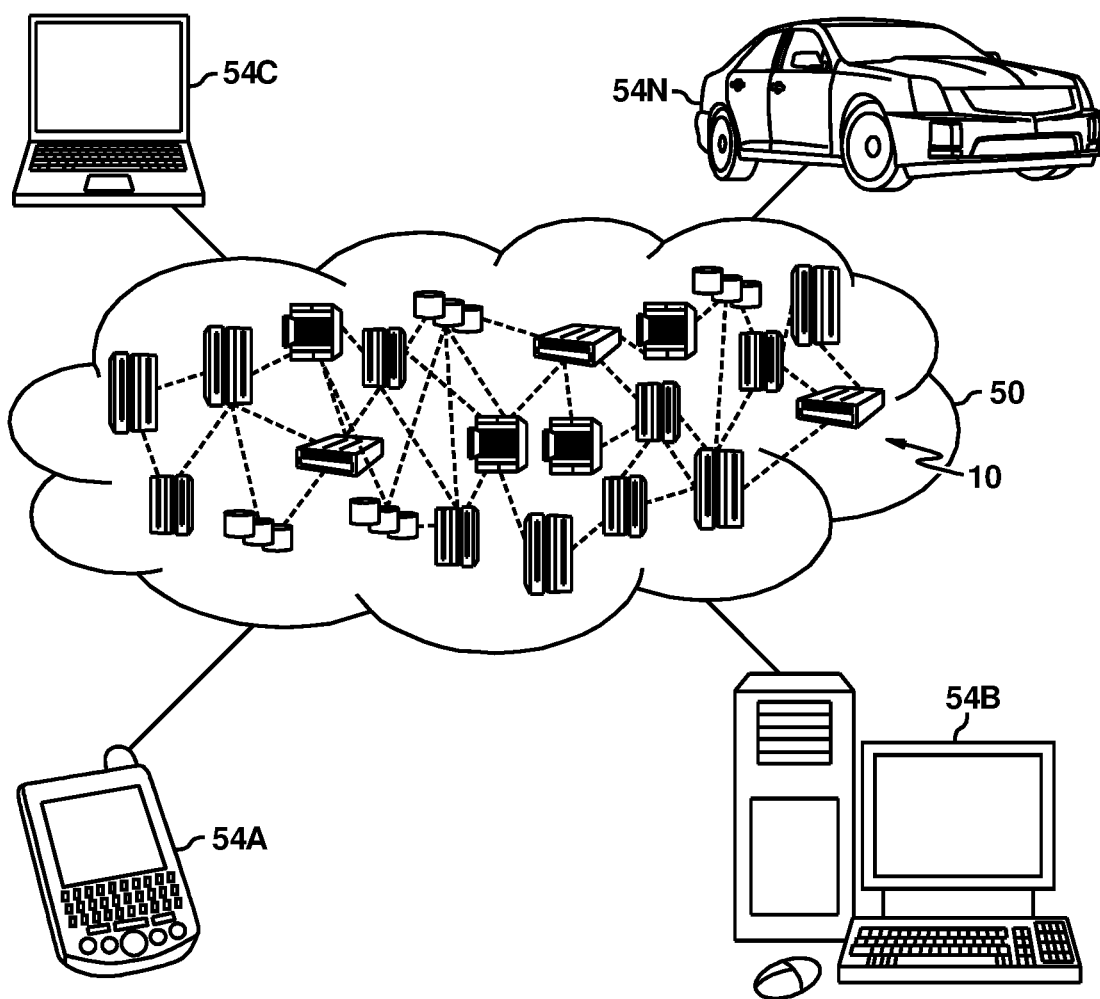
FIG. 4 is a functional block diagram depicting a cloud computing environment, in accordance with an embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
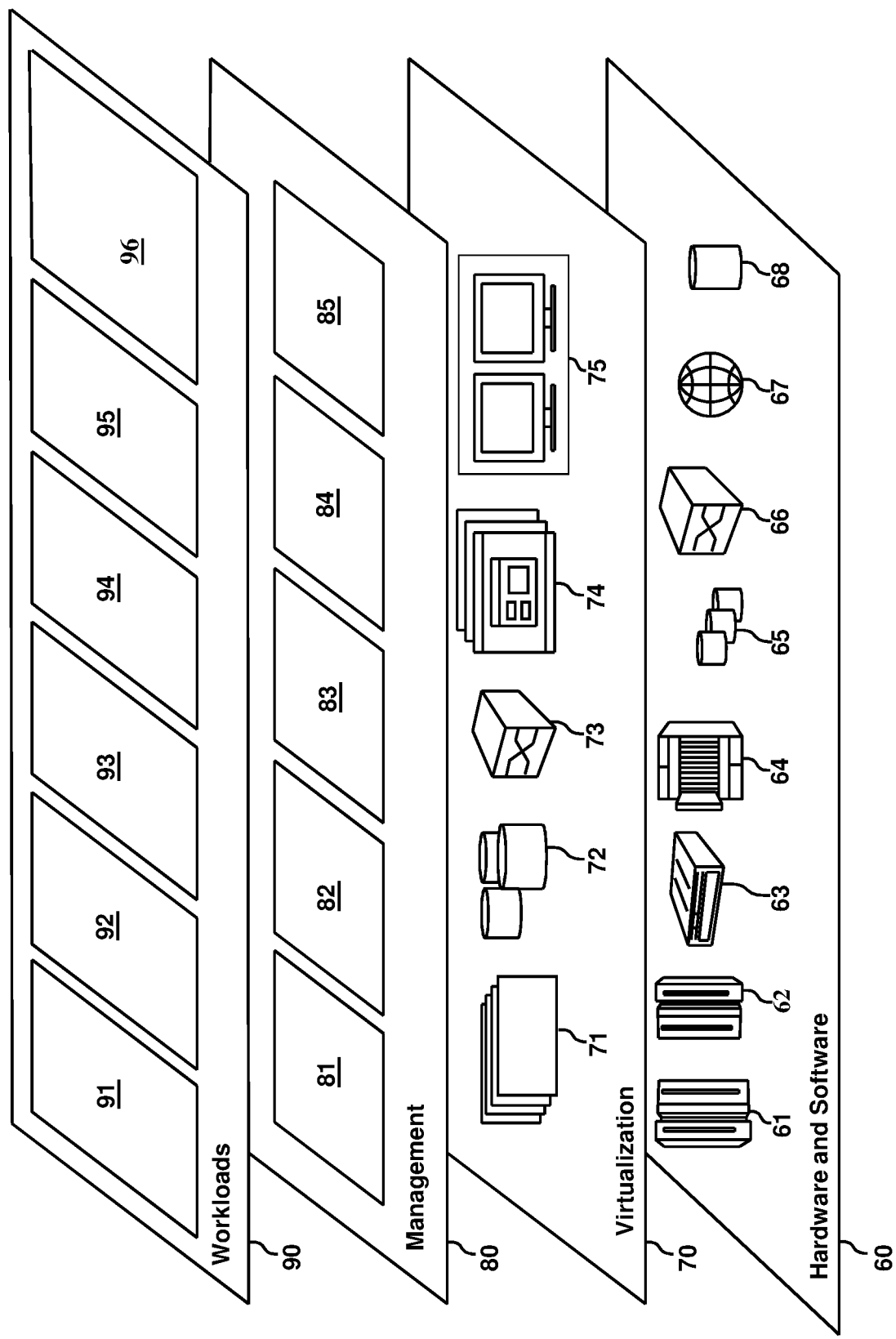
FIG. 5 is a diagram depicting abstraction model layers provided by the cloud computing environment of FIG. 4, in accordance with an embodiment of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and modifying navigation command 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
predicting a user's navigational action, wherein predicting includes a navigational program analyzing sensor data received from sensors to predict the user's navigational action;
receiving sensor data and comparing a predicted navigational action with historical data and threshold reaction times to determine whether the predicted navigational action deviates from the historical data and the threshold reaction times; and
modifying a navigation command based on comparing the user's predicted navigational action to a recommended navigational action, wherein modifying the navigation command includes suppressing a queued navigation command to a user based on the user's predicted navigational action conforming to a predetermined navigational action, increasing a frequency of communicating a queued navigation command, and decreasing a frequency of communicating a queued navigation command.

2. The method of claim 1, wherein modifying the navigation command comprises suppressing a queued navigation command to a user based on the user's predicted navigational action conforming to a predetermined navigational action, wherein suppressing includes muting the vehicle navigation system such that the subsequent recommended navigational action is not relayed to the user.

3. The method of claim 1, wherein predicting the user's navigational action is based on information received from one or more sensors embedded in a vehicle.

4. The method of claim 3, wherein the information received form from the one or more sensors comprises:
a braking event, an acceleration event, a speed limit indication, a turn signal activation, a windshield wiper engagement, a radio sound detection, an ambient sound detection, an image processing result, a fault code trigger, an in-vehicle camera image detection, or an external vehicle image detection.

5. The method of claim 1, further comprising:
comparing the user's predicted navigational action to historical data of a user.

6. A computer system, comprising:
one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
predicting a user's navigational action, wherein predicting includes receiving sensor data and comparing a predicted navigational action with historical data and threshold reaction times to determine whether the predicted navigational action deviates from the historical data and the threshold reaction times; and
modifying a navigation command based on comparing the user's predicted navigational action to a recommended navigational action, wherein modifying the navigation command includes suppressing a queued navigation command to a user based on the user's predicted navigational action conforming to a predetermined navigational action, increasing a frequency of communicating a queued navigation command to a user; and decreasing a frequency of communicating a queued navigation command to the user.

7. The computer system of claim 6, wherein the modifying the navigation command comprises suppressing a queued navigation command to a user based on the user's predicted navigational action conforming to a predetermined navigational action, wherein suppressing includes muting the vehicle navigation system such that the subsequent recommended navigational action is not relayed to the user.

8. The computer system of claim 6, wherein predicting the user's navigational action is based on information received from one or more sensors embedded in a vehicle.

9. The computer system of claim 8, wherein the information
received from the one or more sensors comprises:
a braking event, an acceleration event, a speed limit indication, a turn signal activation, a windshield wiper engagement, a radio sound detection, an ambient sound detection, an image processing result, a fault code trigger, an in-vehicle camera image detection, or an external vehicle image detection.

10. A computer program product, comprising:
one or more computer-readable tangible storage media and program instructions stored on at least one of the one or more computer-readable tangible storage media, the program instructions executable by a processor to cause the processor to perform a method comprising:
predicting a user's navigational action, wherein predicting includes receiving sensor data and comparing a predicted navigational action with historical data and threshold reaction times to determine whether the predicted navigational action deviates from the historical data and the threshold reaction times; and
modifying a navigation command based on comparing the user's predicted navigational action to a recommended navigational action, wherein modifying the navigation command includes suppressing a queued navigation command to a user based on the user's predicted navigational action conforming to a predetermined navigational action, and communicating a navigation command to a user based on the user's predicted navigational action deviating from a predetermined navigational action.

11. The computer program product of claim 10, wherein the modifying the navigation command comprises suppressing a queued navigation command to a user based on the user's predicted navigational action conforming to a predetermined navigational action, wherein suppressing includes muting the vehicle navigation system such that the subsequent recommended navigational action is not relayed to the user.

12. The computer program product of claim 10, wherein predicting the user's navigational action is based on information received from one or more sensors embedded in a vehicle.

13. The computer program product of claim 12, wherein the information received from the one or more sensors comprises:
a braking event, an acceleration event, a speed limit indication, a turn signal activation, a windshield wiper engagement, a radio sound detection, an ambient sound detection, an image processing result, a fault code trigger, an in-vehicle camera image detection, or an external vehicle image detection.

14. The computer program product of claim 10, further comprising:
comparing the user's predicted navigational action to historical data of a user.

* * * * *